United States Patent Office 3,364,238
Patented Jan. 16, 1968

3,364,238
3 - OXYGENATED SPIRO[ANDROSTENE - 17,1'-CYCLOPROP - 2' - ENE],2',3' - DIHYDRO DERIVATIVES CORRESPONDING AND INTERMEDIATES THERETO
Walter R. Benn, Deerfield, Ill., assignor to G. D. Searle & Co., Chicago, Ill., a corporation of Delaware
No Drawing. Filed Apr. 4, 1966, Ser. No. 540,172
11 Claims. (Cl. 260—397.3)

The present invention is concerned with novel steroidal derivatives characterized by a 17 - spirocyclo - propyl or 17 - spirocyclopropenyl substituent and, more particularly, with 3 - oxygenated spiro[androstene - 17,1'-cycloprop - 2' - enes], the 2', 3' - dihydro derivatives corresponding and intermediates thereto. Those spiro compounds are represented by the following structural formulas

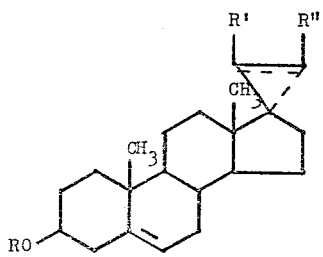

and

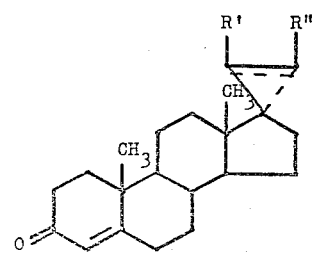

wherein R can be hydrogen or a lower alkanoyl radical, R' and R'' can be hydrogen or a lower alkyl radical and the dotted line indicates an optional double bond between carbon atoms 2' and 3'.

The lower alkanoyl radicals denoted by R in the foregoing structural representation are typified by formyl, acetyl, propionyl, butyryl, valeryl, caproyl, heptanoyl and the branched-chain groups isomeric therewith. Typical of the lower alkyl radicals encompassed by R' and R'' are methyl, ethyl, propyl, butyl, pentyl, hexyl, heptyl and the corresponding branched-chain isomeric groups.

The compounds of the present invention are conveniently manufactured by utilizing as starting materials 3β-(lower alkanoyl)oxypregna - 5,17(20) - dien - 21 - als of the following structural formula

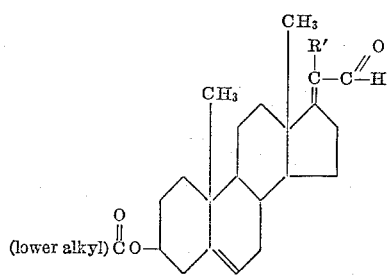

wherein R' is hydrogen or a lower alkyl radical. When those aldehydes are allowed to react with a sulfonylhydrazine, optionally in the presence of a suitable acid catalyst, the corresponding sulfonylhydrazones are produced. As a specific example, 3β - acetoxypregna - 5,17 (20) - dien - 21 - al is heated in ethanol solution with p - toluene - sulfonylhydrazine in the presence of a catalytic quantity of acetic acid to afford 3β - acetoxypregna-5,17(20) - dien - 21 - al p - toluenesulfonylhydrazone. These intermediate sulfonylhydrazones are alternatively produced by condensation of the aldehyde starting materials with hydrazine followed by acylation of the resulting hydrazone with the appropriate sulfonyl halide. That two-step procedure is illustrated by the reaction of the aforementioned 3β - acetoxypregna - 5,17(20) - dien - 21 - al with hydrazine hydrate in isopropyl alcohol solution in the presence of acetic acid to afford the corresponding hydrazone followed by acylation with p - toluenesulfonyl chloride to yield the aforementioned p - toluenesulfonyl - hydrazone. Other sulfonyl halides such as methane - sulfonyl chloride, benzenesulfonyl chloride and p-bromobenzenesulfonyl chloride afford the corresponding sulfonylhydrazones. The sulfonylhydrazone intermediates decompose upon irradiation with ultraviolet light to yield the instant spiro[androst - 5 - ene - 17,1'-cycloprop - 2' - enes]. That process is preferably conducted in a non-hydroxylic solvent such as a dialkyl ether of ethylene glycol or of diethylene glycol, in the presence of a basic catalyst such as sodium methoxide or potassium tertiary - butoxide. 3β - acetoxypregna - 5,17(20)-dien - 21 - al - p - toluenesulfonylhydrazone, for example, in diethylene glycol dimethyl ether, in the presence of an equivalent quantity of sodium methoxide, is irradiated with ultraviolet light until the evolution of nitrogen ceases, thereby affording 3β - acetoxy - spiro[androst - 5 - ene - 17,1' - cycloprop - 2' - ene].

The instant 2' and 3' monoalkylcyclopropenyl/cyclopropanyl derivatives are alternatively produced by alkylation of the corresponding desalkyl compounds of the present invention. That transformation is conveniently accomplished by contacting the desalkyl substance in an inert solvent medium, such as tetrahydrofuran, ethyl ether, dioxane or diethylene glycol dimethyl ether, first with an alkyl lithium then with the corresponding alkyl halide. A specific example is the reaction of 3β-hydroxyspiro[androst-5-ene-17,1'-cycloprop-2'-ene] in tetrahydrofuran first with methyl lithium then with methyl iodide to afford a mixture of the isomeric 3β-hydroxy-spiro[androst-5-ene-17,1'-(2'-methylcycloprop-2'-ene)] and 3β-hydroxy - spiro[androst-5-ene-17,1'-(3'-methylcycloprop-2'-ene)], which are separated by fractional crystallization. When the latter process is applied to those monoalkyl derivatives, the corresponding dialkyl compounds are produced. The aforementioned mixture of 3β-hydroxy-spiro [androst-5-ene-17,1'-(2'-methylcycloprop - 2' - ene)] and 3β - hydroxy - spiro[androst-5-ene-17,1'-(3'-methylcycloprop-2'-ene)] is thus contacted with methyl lithium and methyl iodide to yield 3β-hydroxy-spiro[androst-5-ene-17,1'-(2',3'-dimethylcycloprop-2'-ene)].

The instant spiro[androst-5-ene-17,1' - cyclopropanes] are suitably obtained by catalytic hydrogenation of the corresponding spiro[androst - 5 - ene - 17,1'-cycloprop-2'-enes]. Hydrogenation at atmospheric pressure and room temperature in the presence of 5% palladium-on-calcium carbonate catalyst of 3β-acetoxy-spiro[androst-5-ene-17,1' - cycloprop - 2' - ene] thus affords 3β-acetoxy-spiro [androst-5-ene-17,1'-cyclopropane].

When the instant 3-(lower alkanoyl)oxy compounds are heated with an alkaline reagent such as potassium hydroxide, sodium hydroxide, sodium bicarbonate or sodium methoxide in a suitable organic solvent, typically a lower alkanol, the instant 3-hydroxy substances are produced. A specific illustration is the preparation of 3β-hydroxy-spiro[androst-5-ene-17,1' - cyclopropane] by refluxing a methanolic solution containing 3β-acetoxy-spiro [androst - 5 - ene-17,1'-cyclopropane] and potassium hydroxide.

The 3-keto-Δ⁴ compounds of the present invention are conveniently produced by oxidation of the above described 3β-hydroxy-Δ⁵ substances, suitably by the Oppenauer procedure. Thus, 3β-hydroxy-spiro[androst-5-ene-17,1′-cycloprop-2′-ene] is heated with cyclohexanone and aluminum isopropoxide in toluene solution to afford 3-oxo-spiro[androst-4-ene-17,1′-cycloprop-2′-ene].

The compounds of this invention are useful in view of their valuable pharmacological properties. They are, in particular, anti-protozoal agents as is evidenced by their ability to inhibit the growth of such organisms as *Tetrahymena gelleii*. In addition, they possess antipepsin activity as indicated by their ability to inhibit the proteolytic action of that enzyme.

The following examples describe in detail certain of the compounds illustrative of the present invention together with methods which have been devised for their manufacture. The invention, however, is not to be construed as limited thereby either in spirit or in scope since it will be apparent to those skilled in the art that many modifications both in materials and methods may be practiced without departing from the purpose and intent of this disclosure. In the examples hereinafter detailed temperatures are given in degrees centigrade (° C.) and quantities of materials in parts by weight except as otherwise noted.

EXAMPLE 1

To a solution of 24 parts of 3β-acetoxypregna-5,17(20)-dien-21-al in 400 parts of ethanol is added successively, at about 45°, a solution of 18.6 parts of p-toluenesulfonylhydrazine in 140 parts of ethanol and 0.25 part of glacial acetic acid. The resulting reaction mixture is kept at 45–50° for about 30 minutes, then is partially concentrated under reduced pressure while the temperature is kept below 55°. A portion of the solid product precipitates during the distillation. The concentrated mixture is then cooled at 0–5°, and the resulting solids are collected by filtration and washed on the filter with cold ethanol to afford 3β-acetoxypregna-5,17(20)-dien-21-al p-toluenesulfonylhydrazone, which melts with decomposition at about 210–214°. This compound exhibits ultraviolet absorption maxima at about 225, 265 and 270 millimicrons with molecular extinction coefficients of about 13,600, 26,250 and 26,200, respectively. Infrared absorption peaks are observed, in potassium bromide, at about 3.10, 5.79, 6.01, 6.24, 7.96 and 8.55 microns. Nuclear magnetic resonance peaks are observed at about 46.5, 61.5, 122, 145, 275, 323, 342.5, 351, 441, 452.5 and 433–474 cycles per second. This compound is represented by the following structural formula

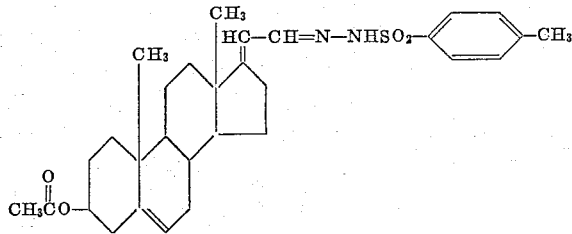

EXAMPLE 2

When an equivalent quantity of 3β-propionoxy-pregna-5,17(20)-dien-21-al is allowed to react with p-toluenesulfonylhydrazine according to the procedure described in Example 1, there is obtained 3β-propionoxypregna-5,17(20)-dien-21-al p-toluenesulfonylhydrazone.

EXAMPLE 3

To a solution of 5.24 parts of 3β-acetoxypregna-5,17(20)-dien-21-al p-toluenesulfonylhydrazone in 500 parts by volume of diethylene glycol dimethyl ether, under nitrogen, is added 0.61 part of sodium methoxide, and the resulting slurry is irradiated with ultraviolet light for about one hour. During the course of the irradiation, nitrogen gas is slowly evolved and the reaction mixture develops a pink color. Completion of the reaction is indicated by cessation of the evolution of nitrogen gas and dissipation of the pink color characteristic of the intermediate unsaturated diazo compound. At the end of the reaction period, the mixture is filtered in order to remove precipitated solids, and the filtrate is concentrated to dryness by distillation under reduced pressure. The crude product thus obtained is purified by dissolution in benzene and adsorption of the impurities on a silica gel column. The benzene eluate is concentrated to dryness to afford 3β-acetoxyspiro[androst-5-ene-17,1′-cycloprop-2′-ene] as a white solid. Recrystallization from methylcyclohexane affords the pure material, melting at about 126–129°. It exhibits and optical rotation of −89°, infrared absorption maxima, in potassium bromide, at about 5.75, 6.14, 8.02 and 9.71 microns and also nuclear magnetic resonance peaks at about 42.5, 61.5, 120.7, 275, 323, 426, and 440.5 cycles per second. It is characterized further by the following structural formula

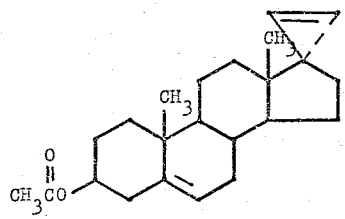

EXAMPLE 4

The substitution of an equivalent quantity of 3β-propionoxypregna-5,17(20)-dien-21-al p-toluenesulfonylhydrazone in the procedure of Example 3 results in 3β-propionoxy-spiro[androst-5-ene-17,1′-cycloprop-2′-ene].

EXAMPLE 5

A solution containing one part of 3β-acetoxy-spiro[androst-5-ene-17,1′-cycloprop-2′-ene] and 2 parts of potassium hydroxide in 56 parts of methanol is stirred at room temperature for about one hour, following which time the reaction mixture is poured into water. The resulting precipitated product is collected by filtration and dried at reduced pressure. Purification is effected either by recrystallization from acetone-hexane or by sublimation at 110° and 0.01 mm. pressure to afford 3β-hydroxy-spiro[androst-5-ene-17,1′-cycloprop-2′-ene], melting at about 139–141°. This compound exhibits an optical rotation of −96.5° in chloroform and displays infrared absorption peaks, in potassium bromide, at about 2.95, 6.15, 9.45 and 9.66 microns and also nuclear magnetic resonance maxima at about 42.5, 61, 107, 210, 323, 428 and 442 cycles per second.

EXAMPLE 6

A solution containing 0.92 part of 3β-hydroxy-spiro[androst-5-ene-17,1′-cycloprop-2′-ene], 0.9 part of aluminum isopropoxide and 8.6 parts of cyclohexanone in 83 parts of toluene is heated, under nitrogen, at the reflux temperature for about 45 minutes, during which time approximately 5 parts by volume of solvent is distilled. Following slight cooling of the reaction mixture, 10 parts by volume of saturated aqueous sodium potassium tartrate is added, and the resulting mixture is steam distilled for about 2 hours. The resulting aqueous residual mixture is cooled, and the precipitated solids are collected by filtration, then extracted with benzene. The benzene extract is chromatographed on a silica gel column, and the column is eluted with 4% ether in benzene to afford the crude product. Recrystallization of that material from methylcyclohexane results in 3-oxo-spiro[androst-4-ene-17,1′-cycloprop-2′-ene], which melts at about 175–180°. It is further characterized by an optical rotation of +95.5°, an ultraviolet absorption maximum at about 241.5 millimicrons with a molecular extinction coefficient of about 16,200, infrared absorption peaks, in potassium bromide, at about 5.95, 6.09 and 6.19 microns and nuclear magnetic resonance peaks at about 44.7, 71.8, 345.2, 428 and 442 cycles per second. This compound is represented by the following structural formula

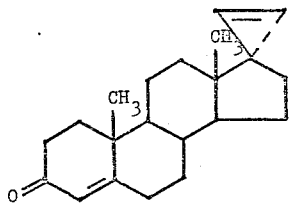

EXAMPLE 7

A solution containing 0.81 part of 3β-acetoxy-spiro[androst-5-ene-17,1'-cycloprop-2'-ene] and 200 parts of ethanol is shaken with 0.2 part of 5% palladium-on-calcium carbonate catalyst in an atmosphere of hydrogen at room temperature and atmospheric pressure for about 24 minutes, during which time one molecular equivalent of hydrogen is absorbed. The catalyst is then removed by filtration, and the filtrate is concentrated to dryness under reduced pressure. Recrystallization of the resulting crude product from methanol affords pure 3β-acetoxy-spiro[androst-5-ene-17,1'-cyclopropane], melting at about 130–135°. This compound possesses an optical rotation of −87° and displays infrared absorption peaks, in potassium bromide, at about 5.74 and 7.99 microns and also nuclear magnetic resonance peaks at about 47.3, 62.6, 122, 273 and 314 cycles per second and a multiplet in the region of 7.1–35.5 cycles per second.

EXAMPLE 8

When an equivalent quantity of 3β-propionoxy-spiro[androst-5-ene-17,1'-cycloprop-2'-ene] is substituted in the procedure of Example 7, there is obtained 3β-propionoxy-spiro[androst-5-ene-17,1'-cyclopropane].

EXAMPLE 9

Method A

A solution containing 0.9 part of 3β-acetoxy-spiro[androst-5-ene-17,1'-cyclopropane], 3 parts of potassium hydroxide and 80 parts of methanol is heated at the reflux temperature, in a nitrogen atmosphere, for about 15 minutes, then is cooled and poured carefully into water. The resulting precipitated product is collected by filtration and is purified by recrystallization from methanol to afford 3β-hydroxy-spiro[androst-5-ene-17,1'-cyclopropane], melting at about 134–136°. Infrared absorption maxima are observed, in potassium bromide, at about 2.96, 3.26, 9.45 and 9.54 microns. This compound exhibits also nuclear magnetic resonance peaks at about 47, 61, 99.5, 211 and 321 cycles per second.

Method B

When an equivalent quantity of 3β-hydroxy-spiro[androst-5-ene-17,1'-cycloprop-2'-ene] is hydrogenated according to the procedure of Example 7, there is produced 3β-hydroxy-spiro[androst-5-ene-17,1'-cyclopropane], identical with the product described in Method A of this example.

EXAMPLE 10

A solution containing 0.74 part of 3β-hydroxy-spiro[androst-5-ene-17,1'-cyclopropane], 0.8 part of aluminum isopropoxide, 7.6 parts of cyclohexanone and 70 parts of toluene is slowly distilled over a period of about one hour, during which time approximately 4 parts by volume of distillate are collected. To that reaction mixture is then added excess saturated aqueous sodium potassium tartrate, and the resulting mixture is steam distilled for about 90 minutes. The aqueous mixture thus obtained is filtered, and the solid crude product is purified by recrystallization from acetone-methylcyclohexane to afford 3-oxo-spiro[androst-4-ene-17,1'-cyclopropane], melting at about 145–148°. This compound is further characterized by an ultraviolet absorption maximum at about 241 millimicrons with a molecular extinction coefficient of about 17,300, by infrared absorption peaks, in potassium bromide, at about 5.95, 6.18 and 11.45 microns and also by nuclear magnetic resonance peaks at about 48.8, 71.2 and 344.5 cycles per second.

EXAMPLE 11

To a solution of 1.7 parts of 3β-hydroxy-spiro[androst-5-ene-17,1'-cycloprop-2'-ene] in 180 parts of dry tetrahydrofuran, under nitrogen, are added dropwise with stirring, at about −10°, 15 parts by volume of a 1.66 M ethereal methyl lithium solution, and the resulting reaction mixture is allowed to warm to room temperature, then is stirred for about 4 hours. At the end of that time, the mixture is cooled to about −5° and 3.58 parts of methyl iodide are added dropwise. After warming of that mixture to room temperature, it is stirred for about one hour, then is diluted with ice and water. The resulting aqueous mixture is extracted with ether, and the ether solution is separated, washed successively with water and saturated aqueous sodium chloride, then dried over anhydrous sodium sulfate and distilled to dryness to afford, as a colorless gas, a mixture of 3β-hydroxy-spiro[androst-5-ene-17,1'-(2-methylcycloprop-2'-ene)] and 3β-hydroxy-spiro[androst-5-ene-17,1'-(3'-methylcycloprop-2'-ene)]. Infrared absorption maxima are observed in chloroform at about 2.75, 5.66, 9.55, 9.65 and 10.49 microns and nuclear magnetic resonance peaks are displayed at about 40.7, 44.5, 61, 124.5, 125.7, 211, 323, 390.2 and 403 cycles per second. These isomers are separated by fractional crystallization from ether-methylcyclohexane.

EXAMPLE 12

When an equivalent quantity of ethyl iodide is substituted in the procedure of Example 11, there are obtained 3β-hydroxy-spiro[androst-5-ene-17,1'-(2'-ethylcycloprop-2'-ene)] and 3β-hydroxy-spiro[androst-5-ene-17,1'-(3'-ethylcycloprop-2'-ene)].

EXAMPLE 13

When the mixture of 3β-hydroxy-spiro[androst-5-ene-17,1'-(2'-methylcycloprop-2'-ene)] and 3β-hydroxy-spiro[androst-5-ene-17,1'-(3'-methylcycloprop-2'-ene)] is substituted in the procedure of Example 11, there is produced 3β-hydroxy-spiro[androst-5-ene-17,1'-(2',3'-dimethylcycloprop-2'-ene)].

EXAMPLE 14

By substituting equivalent quantities of the mixture of 3β-hydroxy-spiro[androst-5-ene-17,1'-(2'-ethylcycloprop-2'-ene)] and 3β-hydroxy-spiro[androst-5-ene-17,1'-(3'-ethylcycloprop-2'-ene)] and ethyl iodide instead of methyl iodide in the procedure of Example 11, there is produced 3β-hydroxy-spiro[androst-5-ene-17,1'-(2',3'-diethylcycloprop-2'-ene)].

EXAMPLE 15

When an equivalent quantity of the mixture of 3β-hydroxy-spiro[androst-5-ene-17,1'-(2'-methylcycloprop-2'-ene)] and 3β-hydroxy-spiro[androst-5-ene-17,1'-(3'-methylcycloprop-2'-ene)] are substituted in the procedure of Example 6, there are produced 3-oxo-spiro[androst-4-ene-17,1'-(2'-methylcycloprop-2'-ene)] and 3-oxo-spiro[androst-4-ene-17,1'-(3'-methylcycloprop-2'-ene)].

EXAMPLE 16

When an equivalent quantity of the mixture of 3β-hydroxy-spiro[androst-5-ene-17,1'-(2'-methylcycloprop-2'-ene)] and 3β-hydroxy-spiro[androst-5-ene-17,1'-(3'-methylcycloprop-2'-ene)] are substituted in the procedure of Example 7, there are produced 3β-hydroxy-spiro[androst - 5 - ene-17,1'-(2'-methylcyclopropane)] and 3β-hydroxy-spiro[androst - 5 - ene-17,1'-(3'-methylcyclopropane)].

EXAMPLE 17

When an equivalent quantity of 3β-hydroxy-spiro[androst-5-ene-17,1' - (2' - methylcyclopropane)] or 3β-hydroxy-spiro[androst-5-ene-17,1' - (3' - methylcyclopropane)] is substituted in the procedure of Example 6, there are obtained 3-oxo-spiro[androst-4-ene-17,1'-(2'-methylcyclopropane)] and 3-oxo-spiro[androst-4-ene-17,1'-(3'-methylcyclopropane)], respectively.

EXAMPLE 18

The substitution of an equivalent quantity of 3β-hydroxy-spiro[androst-5-ene-17,1' - (2',3'-dimethylcycloprop-2'-ene)] in the procedure of Example 7 results in 3β-hydroxy-spiro[androst-5-ene - 17,1' - (2',3' - dimethylcyclopropane)].

EXAMPLE 19

When an equivalent quantity of 3β-hydroxy-spiro[androst-5-ene-17,1'-(2',3'-dimethylcyclopropane)] is substituted in the procedure of Example 6, there is produced 3-oxo-spiro[androst-4 - ene - 17,1' - (2',3' - dimethylcyclopropane)].

EXAMPLE 20

The substitution of an equivalent quantity of 3β-acetoxy-spiro[androst-5-ene-17,1'-cycloprop-2'-ene] in the procedure of Example 11 followed by re-acetylation results in 3β-acetoxy-spiro[androst-5-ene-17,1'-(2'-methylcycloprop-2'-ene)] and 3β-acetoxy-spiro[androst-5-ene-17,1'-(3'-methylcycloprop-2'-ene)].

EXAMPLE 21

When either 3β-acetoxy-spiro[androst-5-ene-17,1'-(2'-methylcycloprop-2'-ene)] or 3β-acetoxy-spiro[androst-5-ene-17,1'-(3'-methylcycloprop-2'-ene)] or a mixture thereof is substituted in the procedure of Example 11 and the resulting product is re-acetylated, there is produced 3β-acetoxy-spiro[androst-5 - ene - 17,1' - (2',3' - dimethylcycloprop-2'-ene)].

EXAMPLE 22

When 3β-acetoxy-spiro[androst-5-ene-17,1'-(2'-methylcycloprop-2'-ene)] or 3β-acetoxy-spiro[androst-5-ene-17,1'-(3'-methylcycloprop-2'-ene)] is substituted in the procedure of Example 7, there are obtained 3β-acetoxy-spiro[androst-5-ene-17,1'-(2'-methylcyclopropane)] and 3β-acetoxy-spiro[androst-5-ene - 17,1' - (3' - methylcyclopropane)], respectively.

EXAMPLE 23

By substituting an equivalent quantity of 3β-acetoxy-spiro[androst-5-ene - 17,1' - (2',3' - dimethylcycloprop-2'-ene)] and otherwise proceeding according to the processes described in Example 7, there is obtained 3β-acetoxy-spiro[androst-5-ene-17,1'-(2',3'-dimethylcyclopropane)].

What is claimed is:
1. A member selected from the group consisting of compounds of the formulas

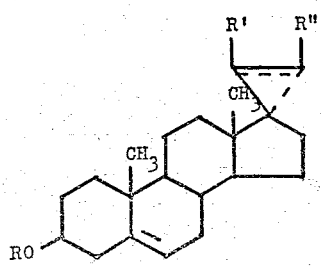

and

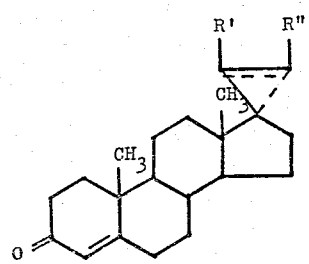

wherein R is a member of the class consisting of hydrogen and lower alkanoyl, R' and R" are selected from the group consisting of hydrogen and lower alkyl and the dotted line indicates the optional presence of a double bond.

2. As in claim 1, a compound of the formula

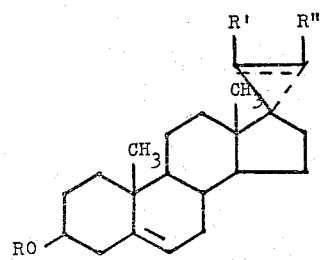

wherein R is a member of the class consisting of hydrogen and lower alkanoyl, R' and R" are selected from the group consisting of hydrogen and lower alkyl and the dotted line indicates the optional presence of a double bond.

3. As in claim 1, a compound of the formula

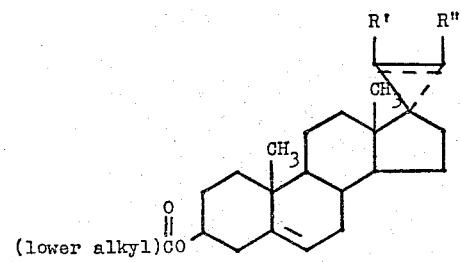

wherein R' and R" are selected from the group consisting of hydrogen and lower alkyl and the dotted line indicates the optional presence of a double bond.

4. As in claim 1, a compound of the formula

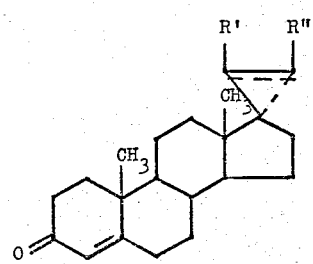

wherein R' and R" are selected from the group consisting of hydrogen and lower alkyl and the dotted line indicates the optional presence of a double bond.

5. As in claim 1, the compound which is 3β-acetoxy-spiro[androst-5-ene-17,1'-cycloprop-2'-ene].
6. As in claim 1, the compound which is 3β-acetoxy-spiro[androst-5-ene-17,1'-cyclopropane].
7. As in claim 1, the compound which is 3β-hydroxy-spiro[androst-5-ene-17,1'-cycloprop-2'-ene].
8. As in claim 1, the compound which is 3β-hydroxy-spiro[androst-5-ene-17,1'-cyclopropane].

9. As in claim 1, the compound which is 3-oxo-spiro [androst-4-ene-17,1'-cycloprop-2'-ene].

10. As in claim 1, the compound which is 3-oxo-spiro [androst-4-ene-17,1'-cyclopropane].

11. 3β-acetoxypregna-5,17(20)-dien-21-al p-toluenesulfonylhydrazone.

References Cited
UNITED STATES PATENTS 3,318,924  5/1967  Georgian _____ 260—397.4

ELBERT L. ROBERTS, *Primary Examiner.*

HENRY FRENCH, *Assistant Examiner.*